United States Patent
Niino et al.

(10) Patent No.: US 6,787,226 B2
(45) Date of Patent: Sep. 7, 2004

(54) CHOPPED STRANDS AND MOLDED PRODUCT OF UNSATURATED POLYESTER RESIN BMC EMPLOYING THEM

(75) Inventors: Yoshirou Niino, Tokyo (JP); Hideki Endou, Tokyo (JP); Manabu Iizuka, Tokyo (JP); Hisayoshi Daicho, Shizuoka (JP); Hideki Tanaka, Shizuoka (JP); Yuji Yoshimoto, Shizuoka (JP)

(73) Assignees: Asahi Fiber Glass Company Limited, Tokyo (JP); Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/274,914

(22) Filed: Oct. 22, 2002

(65) Prior Publication Data

US 2003/0108741 A1 Jun. 12, 2003

(30) Foreign Application Priority Data

Oct. 23, 2001 (JP) ........................................ 2001-324777

(51) Int. Cl.$^7$ ............................. D02D 3/00; B32B 27/04
(52) U.S. Cl. ........................ 428/361; 428/359; 428/375; 428/378; 428/391; 428/392; 428/396; 428/297.4; 428/300.1
(58) Field of Search .................................. 428/359, 361, 428/297.1, 300.1, 378, 396, 375, 391, 392

(56) References Cited

U.S. PATENT DOCUMENTS

| | | | | |
|---|---|---|---|---|
| 5,712,036 A | * | 1/1998 | Piret ........................... | 428/378 |
| 5,985,465 A | | 11/1999 | Daichou et al. | |
| 6,025,073 A | * | 2/2000 | Piret ........................... | 428/392 |
| 6,211,280 B1 | * | 4/2001 | Schell ......................... | 524/494 |
| 2003/0083420 A1 | * | 5/2003 | Yoshimoto et al. ......... | 524/494 |
| 2003/0108741 A1 | * | 6/2003 | Niino et al. ................ | 428/375 |

FOREIGN PATENT DOCUMENTS

| | | |
|---|---|---|
| JP | 5-293823 | 11/1993 |

* cited by examiner

*Primary Examiner*—Cynthia Kelly
*Assistant Examiner*—J. M. Gray
(74) *Attorney, Agent, or Firm*—Oblon, Spivak, McClelland, Maier & Neustadt, P.C.

(57) ABSTRACT

Chopped strands having a sizing agent impregnated on glass fiber strands, to be used for a molded product of unsaturated polyester resin BMC, wherein the sizing agent comprises a urethane resin, a vinyl acetate resin and a silane coupling agent, and wherein the mass ratio of the urethane resin to the vinyl acetate resin is from 30:70 to 70:30.

12 Claims, No Drawings

CHOPPED STRANDS AND MOLDED PRODUCT OF UNSATURATED POLYESTER RESIN BMC EMPLOYING THEM

BACKGROUND OF THE INVENTION

1. Field of the Invention

The present invention relates to glass chopped strands (hereinafter referred to as CS) to be used for a molded product of BMC containing an unsaturated polyester as the main component of the matrix resin, and a molded product of unsaturated polyester resin BMC employing them.

2. Discussion of Background

Glass fibers are widely used as reinforcing fibers for the production of FRP. For industrial purposes, glass fibers are used in the form of glass fiber strands having a number of glass fibers withdrawn from bushing bundled, in many cases. It is common to have a sizing agent comprising a silane coupling agent and a film-forming agent, applied thereto to prevent thread breakage or fuzzing during their handling or production process (process for production of strands) thereby to improve the operation efficiency and to improve the affinity with the resin. The glass fiber strands thus produced, are dried and used as resin-reinforcing fibers. And, a bulk molding compound (BMC) having glass fibers dispersed in a resin, obtained by uniformly kneading cut products of strands (chopped strands, hereinafter referred to simply as CS) with a resin, is commonly used as a molding material for producing FRP. This molded product of BMC is widely used for various applications, because of merits such as the strength, heat resistance, dimensional stability, etc.

Among them, particularly for a molded product to be used for a reflecting mirror of a head lamp to be mounted on e.g. automobiles, it is common to employ a thermosetting resin, since it is necessary to be durable against a high heat generated from the lamp, and to use a molded product of unsaturated polyester resin BMC employing an unsaturated polyester as the main component of the matrix resin.

As such a molded product of unsaturated polyester resin BMC, for example, JP-A-5-293823 discloses, as a molded product of BMC having high strength while maintaining excellent characteristics of a molded product prepared by the BMC molding method, a molded product of BMC wherein glass chopped strands obtained by cutting a glass strand which is obtained by bundling a group of glass filaments having a sizing agent coated on the surface, are used as a reinforcing material, wherein the number of glass filaments constituting non-fibrillated glass chopped strands is at least 0.1% based on the total number of glass filaments, and wherein the solubility in styrene of the sizing agent is preferably at most 40%, and the time for impregnation of the unsaturated polyester resin is within 10 minutes.

However, when the molded product of BMC is used for e.g. the above-mentioned reflecting mirror for lamps, a primer is coated on the surface of the molded product of BMC after molding and then metal vapor deposition is applied as a reflecting film. Therefore, after coating a primer on the surface of the molded product, leveling and heat curing are required, whereby the molded product is exposed to a high temperature of at least 100° C. Accordingly, it is required that excellent smoothness is maintained even at such a high temperature.

However, if the molded product of BMC is heated after coating the primer, it has sometimes happened that due to the temperature increase by heating, air bubbles internally present in the molded product expand and migrate to the surface of the molded product, thereby to form defects on the appearance of the surface. Namely, when air bubbles are formed at the surface of the molded product, the primer coating film is pushed up by such bubbles to form bubble-like defects, thus impairing the outer appearance and leading to a decrease in the yield in the vapor deposition process.

Such air bubbles are attributable to air contained between CS and the matrix resin, and they are believed to be formed by the following mechanism depending upon the degree of the impregnation property of the matrix resin to CS or the nature of the sizing agent to bundle CS.

Firstly, in a case where the sizing component for CS is stiff, the matrix resin will not sufficiently penetrate into the interior of CS, whereby wettability between the filaments and the matrix resin can not adequately be secured in the interior of CS. Accordingly, an air layer will be present at the interface between the filaments and the matrix resin and will form air bubbles when subjected to heat treatment.

As such a stiff sizing agent, a urethane resin may, for example, be mentioned. In a case where the matrix resin is an unsaturated polyester resin, a styrene monomer is usually employed as a typical crosslinking agent, but a urethane resin is relatively hardly soluble in this styrene monomer. Accordingly, the urethane resin tends to be stiff as a sizing agent and thus tends to include air bubbles.

Accordingly, with the molded product of BMC as disclosed in the above JP-A-5-293823, although the strength can be improved by adjusting the number of glass filaments constituting non-fibrillated glass chopped strands to be at least 0.1% and adjusting the solubility of the sizing agent in styrene to be at most 40%, there is a problem that the solubility of the sizing agent is insufficient, and accordingly, no adequate wettability is secured between the matrix resin and the filaments in the interior of CS, and inclusion of air bubbles can not be avoided.

On the other hand, if the sizing component for CS is softened in order to improve the wettability (the impregnation property) between CS and the matrix resin, CS will be unbound into monofilaments during kneading with the matrix resin. By this unbounding into monofilaments, the volume of the kneaded product expands, and air will be included among the filaments. The air thus included in the material can not completely be removed at the time of molding and will remain in the resulting molded product thereby to form bubble-like defects.

Further, with respect to a question of strength, if the wettability of CS is improved, the flexural strength will be improved, but there will be a problem that deterioration in the impact strength will be observed.

As such a soft sizing agent, a vinyl acetate resin may, for example, be mentioned. The vinyl acetate resin has a high solubility in a styrene monomer, whereby the wettability between CS and the matrix resin will be improved, but by the above-mentioned phenomenon, air bubbles are still likely to form, and the impact strength will also be deteriorated.

In view of the foregoing, in order to let the BMC molding material containing an unsaturated polyester resin as the main component of the matrix resin include no air bubbles while maintaining the mechanical strength, the sizing agent for CS is required to have a proper wettability with the matrix resin and the respective filaments in CS and have a good integrity free from the volume expansion due to unbinding into monofilaments during the kneading of BMC. However, with conventional sizing agents, it has been impossible to satisfy both requirements simultaneously.

SUMMARY OF THE INVENTION

Accordingly, it is an object of the present invention to provide CS having a good integrity and a proper wettability with a matrix resin containing an unsaturated polyester as the main component, so that a molded product of an unsaturated polyester resin BMC is free from air bubbles on the surface of the molded product even at a high temperature and has a property excellent in impact strength, and a molded product of an unsaturated polyester BMC employing such CS.

In order to solve the above problems, the chopped strands of the present invention, are chopped strands having a sizing agent impregnated to glass fiber strands, to be used for a molded product of unsaturated polyester resin BMC, wherein the sizing agent comprises a urethane resin, a vinyl acetate resin and a silane coupling agent, and wherein the mass ratio of the urethane resin to the vinyl acetate resin is from 30:70 to 70:30.

Thus, the sizing agent comprises an urethane resin and a vinyl acetate resin in a prescribed ratio, whereby proper wettability can be obtained between the matrix resin and the respective filaments in CS, and at the same time, the volume expansion by unbinding into monofilaments during kneading of BMC can be prevented. Accordingly, it is possible to prevent formation of air bubbles at the surface of a molded product of BMC obtained by using an unsaturated polyester resin as the matrix, even at a high temperature. Further, the wettability between the matrix resin and the respective filaments in CS will be proper, whereby a molded product of BMC excellent in impact strength, can be obtained.

Further, in a preferred embodiment of the chopped strands of the present invention, the above-mentioned urethane resin comprises an isocyanate component and a polyol component, as the main components, and wherein the isocyanate component contains at least one member selected from the group consisting of dicyclohexylmethane-4,4-diisocyanate, isophorone diisocyanate, hexamethylene diisocyanate and tolylene diisocyanate, and the polyol component contains at least one member selected from the group consisting of a polyester polyol made of a polybutylene adipate or a polyhexamethylene adipate, and a polyether polyol made of a polyoxypropylene polyol or a polyoxybutylene polyol.

By using the urethane resin comprising such an isocyanate component and a polyol component, stiffness of the urethane resin will be reduced, and the urethane resin will be properly swelled by the styrene monomer, whereby proper wettability can be obtained between the matrix resin and the respective filaments, and at the same time, excess fibrillation of CS is prevented, whereby inclusion of air bubbles during kneading can be prevented.

In another preferred embodiment of the chopped strands of the present invention, the above-mentioned vinyl acetate resin contains silanol groups. By such silanol groups, the vinyl acetate resin will be properly swelled, whereby it is possible to prevent unbinding of CS into monofilaments more than necessary by suppression of the solubility in the styrene monomer, and wettability between the matrix resin and the monofilaments will be improved, whereby it is possible to prevent formation of air bubbles in the molded product.

In still another preferred embodiment of the chopped strands of the present invention, the above-mentioned silane coupling agent is an amino type and/or acrylic type, whereby the adhesion between CS and the matrix resin will be improved, and inclusion of air bubbles can effectively be prevented.

In still another preferred embodiment of the chopped strands of the present invention, in a solubility test of the sizing agent, the proportion of the mass of the sizing agent after immersing it in a styrene monomer for 60 minutes, to the mass of the sizing agent before the immersion, is from 3 to 25%. When the solubility is within this range, the wettability of CS will be maintained at a proper level, whereby formation of air bubbles in the molded product can be prevented.

In still another preferred embodiment of the chopped strands of the present invention, in an expansion test of the sizing agent, the proportion of the length of a film of the sizing agent having an aspect ratio of 4:1 after immersing it in a styrene monomer for 60 minutes, to the length in the longitudinal direction of the film before the immersion, is from 1.5 to 2.5 times. If the expansion degree is within this range, it is possible to prevent unbinding of CS into monofilaments more than necessary, and wettability between the matrix resin and the monofilaments will be improved, whereby it is possible to prevent formation of air bubbles in the molded product.

In still another preferred embodiment of the chopped strands of the present invention, in a strand integrity test of the chopped strands containing the sizing agent, the proportion of the volume increase of the chopped strands after immersing and stirring them in acetone for 250 seconds, to the volume before the immersion, is not more than 30%. When the sizing property is within this range, it is possible to prevent unbinding of CS into monofilaments more than necessary, whereby it is possible to prevent formation of air bubbles in the molded product.

In still another preferred embodiment of the chopped strands of the present invention, in a strand integrity test of the chopped strands containing the sizing agent, the mass of fuzz remaining on a sieve having apertures of 4 mm after stirring the chopped strands with steel balls by a paint shaker for 5 minutes, is not more than 1%, based on the amount of the chopped strands introduced. If the sizing property is within this range, the product can be transported without formation of fuzz in the piping, and good handling efficiency can be obtained, and little fibrillation takes place at the initial stage prior to kneading. Accordingly, progress in fibrillation of strands at the time of kneading with the matrix resin, can be controlled, and as a result, it is possible to prevent formation of air bubbles in the molded product.

On the other hand, the molded product of unsaturated polyester resin BMC of the present invention is a molded product of BMC, which is molded by using the above-mentioned chopped strands and which comprises 100 parts by mass of a matrix resin containing an unsaturated polyester resin as the main component, and from 30 to 150 parts by mass of the chopped strands. It is thereby possible to obtain a molded product of BMC which is excellent in mechanical strength and which is free from formation of air bubbles at the surface of the molded product even if it is exposed to a high temperature after the molding.

In a preferred embodiment of the molded product of unsaturated polyester resin BMC of the present invention, in a bulging test of the molded product of unsaturated polyester resin BMC, the number of bulges on the surface of the molded product is zero when the surface of the molded product is coated with a primer, followed by heating for 60 minutes in an atmosphere of 180° C. The molded product is thereby free from formation of air bubbles on the surface of the molded product even if exposed to a high temperature after the molding.

In another preferred embodiment of the molded product of unsaturated polyester resin BMC of the present invention, the molded product of an unsaturated polyester resin BMC is obtained by injection molding, and it is to be used for a reflecting mirror for lamps. This molded product is free from formation of air bubbles at the surface of the molded product even when exposed to a high temperature after the molding, and it is particularly suitable as a molded product where a smooth surface for vapor deposition is required, like a reflecting mirror for lamps.

In still another preferred embodiment of the molded product of unsaturated polyester resin BMC of the present invention, the strength of the molded product of unsaturated polyester resin BMC molded by injection molding, is such that in the flexural strength and Izod impact strength test as stipulated in JIS K6911, the flexural strength is at least 65 MPa, and the notched Izod impact strength is at least 60 J/m. It is thereby possible to obtain a molded product which is excellent not only in prevention of formation of air bubbles but also in the mechanical properties such as flexural strength and impact strength. Accordingly, the molded product of the present invention can be used suitably even at a portion where vibration is vigorous, as represented by a reflecting mirror for lamps for e.g. automobiles.

DETAILED DESCRIPTION OF THE
PREFERRED EMBODIMENTS

Now, the present invention will be described in detail with reference to the preferred embodiments. Firstly, CS containing the sizing agent of the present invention will be described.

CS of the present invention are glass chopped stands which contain, as a sizing agent, a urethane resin, a vinyl acetate resin and a silane coupling agent, and wherein the mass ratio of the urethane resin to the vinyl acetate resin is from 30:70 to 70:30.

As the glass fiber, conventional one may be employed, and as the glass composition, A glass, E glass, ECR glass, S glass or AR glass may, for example, be mentioned. It is particularly preferred to employ glass fiber having a composition of E glass which is inexpensive and commonly used.

The urethane resin is not particularly limited, but preferably comprises an isocyanate component and a polyol component, as the main components, and it is particularly preferred that the isocyanate component contains at least one member selected from the group consisting of dicyclohexylmethane-4,4-diisocyanate, isophorone diisocyanate, hexamethylene diisocyanate and tolylene diisocyanate, and the polyol component contains at least one member selected from the group consisting of a polyester polyol made of a polybutylene adipate or a polyhexamethylene adipate, and a polyether polyol made of a polyoxypropylene polyol or a polyoxybutylene polyol.

As the vinyl acetate resin, conventional one may be employed, and it is not particularly limited. However, a cross-linked type is preferably employed, since the solubility in styrene is low. Particularly, a vinyl acetate resin of a crosslinked type containing silanol groups may be employed particularly preferably, since the solubility in a styrene monomer is low, and it has a swelling nature.

It is essential that the sizing agent of the present invention contains the urethane raisin and the vinyl acetate resin in a mass ratio within a range of from 30:70 to 70:30, preferably from 40:60 to 60:40, whereby proper wettability is obtained between the matrix resin and the respective filaments in CS, and it is possible to prevent the volume expansion due to unbinding into monofilaments during kneading of BMC, at the same time.

If the amount of the urethane resin is less than 30%, or if the amount of the vinyl acetate resin exceeds 70%, the sizing component for CS tends to be softened, and CS tend to be unbound into monofilaments during the kneading with the matrix resin, whereby the volume of the kneaded product tends to expand, and air will be included among the filaments, such being undesirable. Further, if the amount of the urethane resin exceeds 70%, or if the amount of the vinyl acetate resin is less than 30%, the sizing component tends to be stiff, and the matrix resin tends to hardly penetrate into the interior of CS, whereby no adequate wettability can be secured between the matrix resin and the filaments in the interior of CS, and an air layer is likely to present at the interface between the matrix resin and the filaments, such being undesirable. Further, the amount of the sizing agent as a total of the urethane resin and the vinyl acetate resin, to be applied, is preferably from 0.2 to 2.0 parts by mass, per 100 parts by mass of the glass fiber.

Thus, according to the present invention, the vinyl acetate resin which is soluble in a styrene monomer as a crosslinking agent for an unsaturated polyester resin, and the urethane resin which is not soluble but swelling in a styrene monomer, are mixed in prescribed amounts, whereby proper wettability can be obtained between the matrix resin and the respective filaments in CS, and at the same time, it is possible to prevent the volume expansion due to unbinding into monofilaments during the kneading of BMC. Accordingly, it is possible to prevent formation of air bubbles at the surface of a molded product of BMC obtained by using an unsaturated polyester resin as the matrix, even when it is exposed to a high temperature.

Further, the sizing agent of the present invention contain a silane coupling agent. The silane coupling agent is not particularly limited, and a silane coupling agent having at least one alkoxy group selected from the group consisting of a methoxy group and an ethoxy group, and at least one reactive functional group selected from the group consisting of an amino group, a vinyl group, an acrylic group, a methacrylic group, an epoxy group, a mercapto group, a halogen atom and an isocyanate group, may, for example, be mentioned. An amino type coupling agent having an amino group or an acrylic coupling agent having an acrylic group, is particularly preferred, and it is more preferred to use both of them together. The amount of the coupling agent is preferably from 0.1 to 1.0 part by mass, per 100 parts by mass of the sizing agent.

Now, the solubility and the degree of swelling of the sizing agent will be described. In the present invention, when the sizing agent has the following test properties, proper wettability can be obtained between the matrix resin and the respective filaments in CS, and it is also possible to prevent the volume expansion due to unbinding into monofilaments during the kneading of BMC.

Firstly, the sizing agent of the present invention is preferably such that in a solubility test of the sizing agent, the proportion of the mass of the sizing agent after immersing it in a styrene monomer for 60 minutes, to the mass of the sizing agent before the immersion, is from 3 to 25%.

Here, the solubility test in the present invention is meant for a solubility in a styrene monomer as a crosslinking agent for an unsaturated polyester resin, and the solubility is influential over the wettability of CS to the matrix resin. Specifically, 50 g of CS and 100 g of the styrene monomer are charged into a polyethylene container and left to stand at room temperature for 60 minutes, whereupon CS are withdrawn, whereby the solubility is represented by a numerical value which corresponds to the proportion of the deposited amount of the sizing agent, reduced as compared with the initial deposited amount.

If the above proportion is less than 3%, the impregnation with the resin tends to be inadequate, the flexural strength of the molded product of BMC tends to be low, and the possibility of inclusion of air at the non-impregnated portions will tend to be high, such being undesirable. If it exceeds 25%, the impregnation with the resin tends to be excessive, whereby the impact strength tends to be low, such being undesirable.

Further, the sizing agent of the present invention is preferably such that in an expansion test of the sizing agent, the proportion of the length of a film of the sizing agent having an aspect ratio of 4:1 after immersing it in a styrene monomer for 60 minutes, to the length in the longitudinal direction of the film before the immersion, is from 1.5 to 2.5 times.

Here, the expansion test in the present invention is meant for the degree of swelling in a styrene monomer as a crosslinking agent for an unsaturated polyester resin, and this degree of swelling is influential over the difficulty in unbinding of CS during the kneading with the matrix resin. Specifically, the sizing agent is cast on a flat plate to form a strip coating film having a thickness of 0.1 mm, a width of 10 mm and a length of 40 mm, and the coating film is left to stand in a drier at 120° C. for one hour to completely remove the moisture and then immersed in 50 g of a styrene monomer for 60 minutes at room temperature, whereby the degree of swelling is represented by a numerical value which is the proportion swelled in the longitudinal direction.

If the above proportion is less than 1.5, the flexural strength of the molded product tends to be poor and the possibility of inclusion of air at the non-impregnated portions, tends to be high, such being undesirable. If it exceeds 2.5, the impact strength of the molded product tends to be poor, such being undesirable.

The sizing agent of the present invention is applied when a number of glass fibers withdrawn from a bushing and having a diameter of from 6 to 23 $\mu$m, are bundled by a known method. A glass strand thus obtained will be cut into a proper length to obtain CS. The length of CS is not particularly limited, but preferably is within a range of from 1.5 to 25 mm.

Now, the strand integrity test of CS will be described. In the present invention, CS containing the sizing agent preferably have the following test properties, whereby no air bubbles will be incorporated during the molding, and excellent mechanical properties can be obtained.

Firstly, in a strand integrity test of the chopped strands containing the sizing agent of the present invention, the proportion of the volume increase of the chopped strands after immersing and stirring them in acetone for 250 seconds, to the volume before the immersion, is preferably not more than 30%.

Here, the strand integrity test by immersion in acetone in the present invention is such that the gathering or integrity of CS is measured by measuring the bulkiness of CS in acetone, thereby to modify the easiness in inclusion of air during the kneading of CS with the matrix resin. Specifically, 20 g of CS are put into 200 cc of acetone and stirred for 250 seconds by a shaker, whereby the volumes of CS before and after the treatment are measured, to determine the proportion of the volume increase.

If the proportion of the volume increase exceeds 30%, CS tend to be unbound into filaments and thus includes air bubbles, during the kneading with the resin, such being undesirable.

Further, it is preferred that in a strand integrity test of the chopped strands containing the sizing agent, the mass of fuzz remaining on a sieve having apertures of 4 mm after stirring the chopped strands with steel balls by a paint shaker for 5 minutes, is not more than 1%, based on the amount of the chopped strands introduced.

Namely, in the present invention, it is also possible to measure the gathering or integrity of CS by such a strand integrity test by means of a paint shaker, thereby to quantify the easiness in inclusion of air during the kneading CS with the matrix resin. Here, the strand integrity test by means of a paint shaker in the present invention is such that 500 g of CS are put into a cylindrical container having a capacity of 980 cm$^3$, and five steel balls of 45 g/piece were added, followed by stirring at a high speed of 5 minutes, whereupon the proportion of the mass of fuzz remaining on a sieve having apertures of 4 mm, is obtained based on the amount of CS introduced.

If the mass of the above fuzz exceeds 1%, fuzz is likely to form during the transportation of the product, and tends to clog the piping, and CS tend to be readily fibrillated, and accordingly CS tend to be readily fibrillated when kneaded with the resin, such being undesirable.

Now, the molded product of unsaturated polyester resin BMC, which is molded by using the above CS, will be described.

In the molded product of unsaturated polyester resin BMC of the present invention, the matrix resin comprises an unsaturated polyester, a polymerizable monomer having a double bond in one molecule, as a crosslinking agent for curing the unsaturated polyester and a thermoplastic resin for the purpose of suppressing shrinkage during the curing of the unsaturated polyester. The unsaturated polyester resin is such that Tg (glass transition temperature) of the molded product during the curing of the unsaturated polyester is at least 150° C., preferably at least 160° C.

The polymerizable monomer may, for example, be a styrene monomer, vinyltoluene, divinyl benzene, methyl methacrylate, p-methylstyrene, diallyl phthalate or diallyl isophthalate. These polymerizable monomers may be used alone or in combination as a mixture of two or more of them.

The thermoplastic resin may, for example, be a styrene type copolymer, a polyethylene, a polyvinyl chloride, a polyvinyl acetate, a polymethyl methacrylate, a polymethyl methacrylate-type copolymer, a modified ABS resin, a polycaprolactone or a modified polyurethane. Especially, an acrylic resin (inclusive of a copolymer) such as a polymethyl methacrylate or a polymethyl methacrylate copolymer, or a vinyl acetate type resin (inclusive of a copolymer) such as a polyvinyl acetate or a styrene/vinyl acetate copolymer, is preferred from the viewpoint of the dispersibility, low shrinkage and rigidity.

The composition ratio of the above matrix resin is preferably such that in 100 parts by mass of the matrix resin, the unsaturated polyester is from 30 to 60 parts by mass, the polymerizable monomer is from 25 to 60 parts by mass and the thermoplastic resin is from 8 to 35 parts by mass, and more preferably, the unsaturated polyester is from 35 to 50 parts by mass, the polymerizable monomer is from 37 to 50 parts by mass, and the thermoplastic resin is from 10 to 25 parts by mass.

With respect to the ratio of CS to the matrix resin in the molded product of unsaturated polyester BMC of the present invention, it is preferred that CS is contained in an amount of from 30 to 150 parts by mass, per 100 parts by mass of the matrix resin.

If the amount of CS is less than 30 parts by mass, fiber reinforcement tends to be inadequate, and the mechanical strength tends to be low, such being undesirable. If it exceeds 150 parts by mass, CS not impregnated with the matrix resin will be present, whereby inclusion of air in the BMC material tends to be substantial, thus leading to deterioration of the surface property of the molded product of BMC, foaming during the primer treatment and deterioration in fluidity to deteriorate the molding property of BMC.

For the molded product of unsaturated polyester resin BMC of the present invention, a curing catalyst may suitably be employed to initiate the curing reaction of the unsaturated polyester resin. As such a curing catalyst, an organic peroxide such as t-butylperoxy benzoate, t-butylperoxy-2-ethyl hexanoate, t-butylperoxyisopropyl carbonate, 1,1-bis(t-butylperoxy) 3,3,5-trimethyl siloxane, is preferably employed. The curing catalyst may be employed preferably in an amount of from 0.5 to 5.0 parts by mass, more preferably from 1.0 to 4.0 parts by mass, per 100 parts by mass of the matrix resin.

To the molded product of polyester resin BMC of the present invention, various inorganic fillers known in this field, may be incorporated. As such inorganic fillers, calcium carbonate, mica, talc, graphite, carbon black, asbestos and aluminum hydroxide, may, for example, be mentioned. It is particularly preferred to incorporate calcium carbonate having an average particle size of from 0.2 to 20 $\mu$m in an amount of from 230 to 380 parts by mass per 100 parts by mass of the matrix resin. It is thereby possible to secure a proper fluidity required to carry out injection molding to obtain a molded product of polyester resin BMC.

Further, for the molded product of polyester resin BMC of the present invention, an internal release agent may be used in order to readily remove the low shrinkable molded product from the mold. As such a release agent, a metal salt of a fatty acid such as zinc stearate, magnesium stearate, calcium stearate or aluminum stearate, may, for example, be preferably employed. The amount is preferably from 2 to 10 parts by mass, more preferably from 3 to 8 parts by mass, per 100 parts by mass of the matrix resin. If it is at least 2 parts by mass, removal from the mold can be carried out stably without forming cracks or the like in the molded product, and if it is not higher than 10 parts by mass, coating of a primer on the surface of the molded product can easily be carried out, and the leveling property and adhesion of the coating can adequately be secured.

Further, to the molded product of polyester resin BMC of the present invention, a pigment and a thickner such as magnesium oxide or calcium oxide, may also be incorporated, as the case requires.

As a molding method for the molded product of unsaturated polyester BMC of the present invention, injection molding, transfer molding or injection compression molding may, for example, be employed.

The molded product of unsaturated polyester resin BMC obtained by injection molding, is preferably such that in the flexural strength and Izod impact strength test as stipulated in JIS K6911, the flexural strength is at least 65 MPa, and the notched Izod impact strength is at least 60 J/m. It is thereby possible not only to prevent formation of air bubbles but also to obtain a molded product excellent in mechanical properties such as flexural strength and impact strength.

Accordingly, the molded product of the present invention can suitably be employed at a portion where vibration is vigorous, as represented by a reflecting mirror for lamps for e.g. automobiles.

Further, the above molded product is preferably such that in a bulging test of the molded product, the number of bulges on the surface of the molded product is zero when the surface of the molded product is coated with a primer, followed by heating for 60 minutes in an atmosphere of 180° C.

Here, the bulging test of the present invention is meant for the number of bubble-like appearance defects formed per 900 cm$^2$ on the surface of the molded product, when a coating material of an acrylic type or polybutadiene type as a primer, is coated in a thickness of from 10 to 20 $\mu$m on the surface of the molded product by spray coating, followed by curing at 180° C. for 60 minutes, and the number is regarded as the number of bulges.

When the number of bulges is zero, it is possible to obtain a molded product of BMC which has a sufficient effect for preventing formation of air bubbles even when it is used for the above-mentioned reflecting mirror for lamps.

The molded product of the present invention thus obtained, can be used for various applications. However, it is particularly suitably employed as a molded product for a reflecting mirror for lamps for e.g. automobiles, since no air bubbles will be formed even when it is exposed to a high temperature after molding, as mentioned above, and the surface smoothness can be maintained even when a primer is coated on the molded product.

Now, the present invention will be described in further detail with reference to Examples. However, it should be understood that the present invention is by no means restricted to such specific Examples.

EXAMPLE 1

A sizing agent comprising 3.4 parts by mass of a vinyl acetate resin, 3.4 parts by mass of a urethane resin wherein the isocyanate component is dicyclohexylmethane diisocyanate (H$_{12}$MDI) and the polyol component is polyhexamethylene adipate (PHA), 0.2 part by mass of an amino-type silane coupling agent and 0.2 part by mass of an acrylic silane coupling agent, was prepared.

Then, by a usual method, 1,000 glass fibers having a diameter of 13 $\mu$m, withdrawn from a bushing, were bundled, while applying the above sizing agent thereto, to form a glass strand, and this glass strand was cut to obtain CS of Example 1 having a length of 6 mm.

Further, 90 parts by mass of the CS were kneaded with a raw material comprising 38 parts by mass of an unsaturated polyester, 16 parts by mass of a thermoplastic resin (a polymethyl methacrylate type resin), 46 parts by mass of a styrene monomer, 6 parts by mass of an internal release agent (zinc stearate), 0.4 part by mass of a thickner (magnesium oxide), 3 parts by mass of a catalyst (t-butylperoxy benzoate) and 260 parts by mass of an inorganic filler (calcium carbonate having an average particle size of 5 $\mu$m), in accordance with a usual method, and a molded product of unsaturated polyester resin BMC of this Example was produced by an injection molding method.

EXAMPLE 2

CS of Example 2 were obtained under the same conditions as in Example 1 except that among the urethane resin components, the isocyanate component was changed to tolylene diisocyanate, and the polyol component was changed to polyoxypropylene glycol. Further, the CS were subjected to BMC molding under the same conditions as in Example 1, to obtain a molded product of BMC of Example 2.

EXAMPLE 3

CS of Example 3 were obtained under the same conditions as in Example 1 except that the vinyl acetate resin was changed to 4.4 parts by mass, and the urethane resin was changed to 2.4 parts by mass. Further, the CS were subjected to BMC molding under the same conditions as in Example 1, to obtain a molded product of BMC of Example 3.

EXAMPLE 4

CS of Example 4 were obtained under the same conditions as in Example 1 except that the vinyl acetate resin was changed to 2.4 parts by mass, and the urethane resin was changed to 4.4 parts by mass. Further, the CS were subjected to BMC molding under the same conditions as in Example 1, to obtain a molded product of BMC of Example 4.

EXAMPLE 5

CS of Example 5 were obtained under the same conditions as in Example 1 except that among the urethane resin components, the isocyanate component was changed to xylylene diisocyanate, and the polyol component was changed to polycarbonate polyol. Further, the CS were subjected to BMC molding under the same conditions as in Example 1, to obtain a molded product of BMC of Example 5.

Comparative Example 1

CS of Comparative Example 1 were obtained under the same conditions as in Example 1 except that in the sizing agent of Example 1, no vinyl acetate resin was used, and the urethane resin was changed to 6.8 parts by mass. Further, the CS were subjected to BMC molding under the same conditions as in Example 1, to obtain a molded product of BMC of Comparative Example 1.

Comparative Example 2

CS of Comparative Example 2 were obtained under the same conditions as in Example 1 except that in the sizing agent of Example 1, no urethane resin was used, and the vinyl acetate resin was changed to 6.8 parts by mass. Further, the CS were subjected to BMC molding under the same conditions as in Example 1, to obtain a molded product of BMC of Comparative Example 2.

Comparative Example 3

CS of Comparative Example 3 were obtained under the same conditions as in Example 1 except that in the sizing agent of Example 1, the vinyl acetate resin was changed to 1.4 parts by mass and the urethane resin was changed to 5.4 parts by mass (vinyl acetate:urethane resin=2:8). Further, the CS were subjected to BMC molding under the same conditions as in Example 1, to obtain a molded product of BMC of Comparative Example 3.

Comparative Example 4

CS of Comparative Example 4 were obtained under the same conditions as in Example 1 except that in the sizing agent of Example 1, the vinyl acetate resin was changed to 5.4 parts by mass and the urethane resin was changed to 1.4 parts by mass (vinyl acetate:urethane resin=8:2). Further, the CS were subjected to BMC molding under the same conditions as in Example 1, to obtain a molded product of BMC of Comparative Example 4.

Comparative Example 5

28 Parts by mass of CS of Example 1 were kneaded with a raw material comprising 38 parts by mass of an unsaturated polyester, 16 parts by mass of a thermoplastic resin (a polymethyl methacrylate type resin), 46 parts by mass of a styrene monomer, 6 parts by mass of an internal release agent (zinc stearate), 0.4 part by mass of a thickner (magnesium oxide), 3 parts by mass of a catalyst (t-butylperoxy benzoate) and 260 parts by mass of an inorganic filler (calcium carbonate having an average particle size of 5 $\mu$m), in accordance with a usual method, and a molded product of unsaturated polyester resin BMC of Comparative Example 5 was obtained by an injection molding.

Comparative Example 6

155 Parts by mass of CS of Example 1 were kneaded with a raw material comprising 38 parts by mass of an unsaturated polyester, 16 parts by mass of a thermoplastic resin (a polymethyl methacrylate type resin), 46 parts by mass of a styrene monomer, 6 parts by mass of an inner release agent (zinc stearate), 0.4 part by mass of a thickner (magnesium oxide), 3 parts by mass of a catalyst (t-butylperoxy benzoate) and 260 parts by mass of an inorganic filler (calcium carbonate having an average particle size of 5 $\mu$m), in accordance with a usual method, and a molded product of unsaturated polyester resin BMC of Comparative Example 6 was obtained by an injection molding.

Test Example 1

With respect to CS and sizing agents obtained in Examples 1 to 5 and Comparative Examples 1 to 4, the acetone integrity, the paint shaker integrity, the solubility and the expansion degree, were measured in accordance with the above-described measuring methods, and the integrity, etc. of CS were evaluated. The results are summarized in Table 1.

TABLE 1

| | Vinyl acetate/urethane (parts by mass) | Acetone integrity (%) | Paint shaker integrity (%) | Solubility (%) | Expansion degree |
|---|---|---|---|---|---|
| Ex. 1 | 3.4/3.4 | 10 | 0.4 | 15 | 1.8 |
| Ex. 2 | 3.4/3.4 | 10 | 0.1 | 18 | 1.4 |
| Ex. 3 | 4.4/2.4 | 15 | 0.8 | 21 | 2.0 |
| Ex. 4 | 2.4/4.4 | 5 | 0.3 | 11 | 1.7 |
| Ex. 5 | 3.4/3.4 | 5 | 0.1 | 5 | 1.4 |
| Comp. Ex. 1 | 0/6.8 | 1 | 0.0 | 1 | 1.5 |
| Comp. Ex. 2 | 6.8/0 | 35 | 7.6 | 30 | 3.0 |
| Comp. Ex. 3 | 0.6/6.2 | 10 | 0.5 | 2 | 1.7 |
| Comp. Ex. 4 | 6.2/0.6 | 25 | 7.2 | 27 | 2.9 |

From the result in Table 1 in Examples 1 to 5, each of the evaluated items was within the preferred range prescribed by the present invention. Whereas, in Comparative Example 1, the solubility was as low as 1%. Further, in Comparative Example 2, all evaluated items were outside the preferred ranges prescribed by the present invention. In Comparative Example 3, the solubility was outside the preferred range, and in Comparative Example 4, the paint shaker integrity, the solubility and the expansion degree were outside the ranges prescribed by the present invention.

Test Example 2

Using the molded products of BMC obtained in Examples 1 to 5 and Comparative Examples 1 to 6, test specimen were prepared, and the flexural strength and the notched impact strength were measured in accordance with the test methods of JIS K6911. Further, ten flat sheets of 900 cm$^2$ were molded by injection molding, and an acrylic coating material as a primer coating material was coated thereon in a thickness of 15 μm, followed by curing at 180° C. for 60 minutes, and aluminum vapor deposition was applied, whereupon the number of outer appearance defects was counted as the number of bulges, to evaluate the surface smoothness by the bulging test. The results are summarized in Table 2.

TABLE 2

|  | Vinyl acetate/urethane (parts by mass) | Flexural strength (MPa) | Izod impact strength (J/m) | Charpy impact strength (kJ/m$^2$) | Number of bulges (number) |
|---|---|---|---|---|---|
| Ex. 1 | 3.4/3.4 | 76 | 74 | 7.2 | 0 |
| Ex. 2 | 3.4/3.4 | 70 | 68 | 7.0 | 0 |
| Ex. 3 | 4.4/2.4 | 75 | 72 | 6.9 | 0 |
| Ex. 4 | 2.4/4.4 | 71 | 78 | 7.3 | 0 |
| Ex. 5 | 3.4/3.4 | 62 | 70 | 6.8 | 0 |
| Comp. Ex. 1 | 0/6.8 | 58 | 90 | 8.0 | 1.8 |
| Comp. Ex. 2 | 6.8/0 | 73 | 56 | 6.2 | 2.5 |
| Comp. Ex. 3 | 0.6/6.2 | 63 | 82 | 7.5 | 0.9 |
| Comp. Ex. 4 | 6.2/0.6 | 73 | 58 | 6.7 | 2.1 |
| Comp. Ex. 5 | 3.4/3.4 | 70 | 45 | 4.8 | 0 |
| Comp. Ex. 6 | 3.4/3.4 | 73 | 108 | 10.2 | 1.9 |

From the results of Table 2, it is evident that in Examples 1 to 5, no air bubbles were formed, and the surface smoothness was excellent, whereas in Comparative Examples 1 to 4 and 6, the surface smoothness was poor. Further, as compared with Examples 1 to 5, in Comparative Examples 1 and 3, the flexural strength was poor, and in Comparative Examples 2, 4 and 5, the impact strength was poor, and thus it is evident that a molded product having adequate mechanical strength can not be obtained.

As described in the foregoing, by using CS of the present invention, it is possible to obtain a molded product which is free from formation of air bubbles on the surface of the molded product even at a high temperature and which is excellent also in mechanical strength, when it is formed into a molded product of BMC containing an unsaturated polyester resin as matrix. Accordingly, the molding product of the present invention can be suitably employed, for example, as a molded product for e.g. a reflecting mirror for lamps, which may be exposed to a high temperature after molding.

The entire disclosure of Japanese Patent Application No. 2001-324777 filed on Oct. 23, 2001 including specification, claims and summary is incorporated herein by reference in its entirety.

What is claimed is:

1. Chopped strands having a sizing agent impregnated on glass fiber strands, to be used for a molded product of unsaturated polyester resin BMC, wherein the sizing agent comprises a urethane resin, a vinyl acetate resin and a silane coupling agent, and wherein the mass ratio of the urethane resin to the vinyl acetate resin is from 30:70 to 70:30.

2. The chopped strands according to claim 1, wherein the urethane resin comprises an isocyanate component and a polyol component, as the main components, and wherein the isocyanate component contains at least one member selected from the group consisting of dicyclohexylmethane-4,4-diisocyanate, isophorone diisocyanate, hexamethylene diisocyanate and tolylene diisocyanate, and the polyol component contains at least one member selected from the group consisting of a polyester polyol made of a polybutylene adipate or a polyhexamethylene adipate, and a polyether polyol made of a polyoxypropylene polyol or a polyoxybutylene polyol.

3. The chopped strands according to claim 1, wherein the vinyl acetate resin contains silanol groups.

4. The chopped strands according to claim 1, wherein the silane coupling agent is an amino silane and/or acrylic silane.

5. The chopped strands according to claim 1, wherein in a solubility test of the sizing agent, the proportion of the mass of the sizing agent after immersing it in a styrene monomer for 60 minutes, to the mass of the sizing agent before the immersion, is reduced from 3 to 25%.

6. The chopped strands according to claim 1, wherein in an expansion test of the sizing agent, the proportion of the length of a film of the sizing agent having an aspect ratio of 4:1 after immersing it in a styrene monomer for 60 minutes, to the length in the longitudinal direction of the film before the immersion, is from 1.5 to 2.5:1.

7. The chopped strands according to claim 1, wherein in a strand integrity test of the chopped strands containing the sizing agent, the proportion of the volume increase of the chopped strands after immersing and stirring them in acetone for 250 seconds, to the volume before the immersion, is not more than 30%.

8. The chopped strands according to claim 1, wherein in a strand integrity test of the chopped strands containing the sizing agent, the mass of fuzz remaining on a sieve having apertures of 4 mm after stirring the chopped strands with steel balls by a paint shaker for 5 minutes, is not more than 1%, based on the amount of the chopped strands introduced.

9. A molded product of an unsaturated polyester resin BMC matrix and the chopped strands as defined in claim 1, and which comprises 100 parts by mass of a matrix resin containing an unsaturated polyester resin as the main component, and from 30 to 150 parts by mass of the chopped strands.

10. The molded product of unsaturated polyester resin BMC according to claim 9, wherein in a bulging test of the molded product of unsaturated polyester resin BMC, the number of bulges on the surface of the molded product is zero when the surface of the molded product is coated with a primer, followed by heating for 60 minutes in an atmosphere of 180° C.

11. The molded product of unsaturated polyester resin BMC according to claim 9, which is a molded product obtained by injection molding, and the molded product is to be used for a reflecting mirror for lamps.

12. The molded product of unsaturated polyester resin BMC according to claim 9, wherein in the flexural strength and Izod impact strength test as stipulated in JIS K6911, the flexural strength is at least 65 MPa, and the notched Izod impact strength is at least 60 J/m.

* * * * *